(12) United States Patent
Balachandreswaran

(10) Patent No.: US 11,435,577 B2
(45) Date of Patent: Sep. 6, 2022

(54) FOVEATED PROJECTION SYSTEM TO PRODUCE OCULAR RESOLUTION NEAR-EYE DISPLAYS

(71) Applicant: Dhanushan Balachandreswaran, East Gwillimbury (CA)

(72) Inventor: Dhanushan Balachandreswaran, East Gwillimbury (CA)

(*) Notice: Subject to any disclaimer, the term of this patent is extended or adjusted under 35 U.S.C. 154(b) by 39 days.

(21) Appl. No.: 17/050,434

(22) PCT Filed: Apr. 25, 2019

(86) PCT No.: PCT/IB2019/001476
§ 371 (c)(1),
(2) Date: Oct. 24, 2020

(87) PCT Pub. No.: WO2020/201806
PCT Pub. Date: Oct. 8, 2020

(65) Prior Publication Data
US 2021/0165213 A1 Jun. 3, 2021

Related U.S. Application Data

(60) Provisional application No. 62/662,604, filed on Apr. 25, 2018.

(51) Int. Cl.
*G02B 27/00* (2006.01)
*G02B 27/01* (2006.01)
*G02B 26/08* (2006.01)

(52) U.S. Cl.
CPC ..... *G02B 27/0093* (2013.01); *G02B 27/0172* (2013.01); *G02B 26/0833* (2013.01); *G02B 2027/0138* (2013.01); *G02B 2027/0147* (2013.01); *G02B 2027/0178* (2013.01)

(58) Field of Classification Search
CPC ............ G02B 27/0093; G02B 27/0172; G02B 26/0833; G02B 2027/0138; G02B 2027/0147; G02B 2027/0178
See application file for complete search history.

(56) References Cited

U.S. PATENT DOCUMENTS

| | | | |
|---|---|---|---|
| 2010/0149073 A1* | 6/2010 | Chaum | G02B 27/0075 345/8 |
| 2013/0208362 A1* | 8/2013 | Bohn | G02B 27/017 359/630 |
| 2017/0091549 A1* | 3/2017 | Gustafsson | G06F 3/012 |
| 2017/0285343 A1* | 10/2017 | Belenkii | H04N 13/344 |
| 2017/0316264 A1* | 11/2017 | Gustafsson | G06F 3/012 |
| 2018/0003962 A1* | 1/2018 | Urey | G02B 27/0093 |

(Continued)

*Primary Examiner* — Bryan Earles

(57) ABSTRACT

A foveated projection system in a wearable device is configured for tracking an eye gaze of a user wearing the wearable device. The foveated projection system may distribute and concentrate pixels only at a portion of a display screen of the wearable device, which is in direct line with a current position of the eye gaze of the user. The portion of the display screen will have a high concentration of pixels in comparison to remaining portions of the display screen, which results in the user viewing information within the portion at a high resolution. As the eyes of the user moves in a different position, all the pixels are seamlessly moved to concentrate at new portions of the display screen, which are now in line with most recent positions of the eye gaze of the user.

20 Claims, 16 Drawing Sheets

(56) References Cited

U.S. PATENT DOCUMENTS

| | | | |
|---|---|---|---|
| 2018/0136720 A1* | 5/2018 | Spitzer | G06F 3/013 |
| 2019/0122642 A1* | 4/2019 | Morein | G09G 5/377 |
| 2019/0163267 A1* | 5/2019 | Hainzl | G06F 3/013 |
| 2019/0287495 A1* | 9/2019 | Mathur | G02B 27/0093 |

* cited by examiner

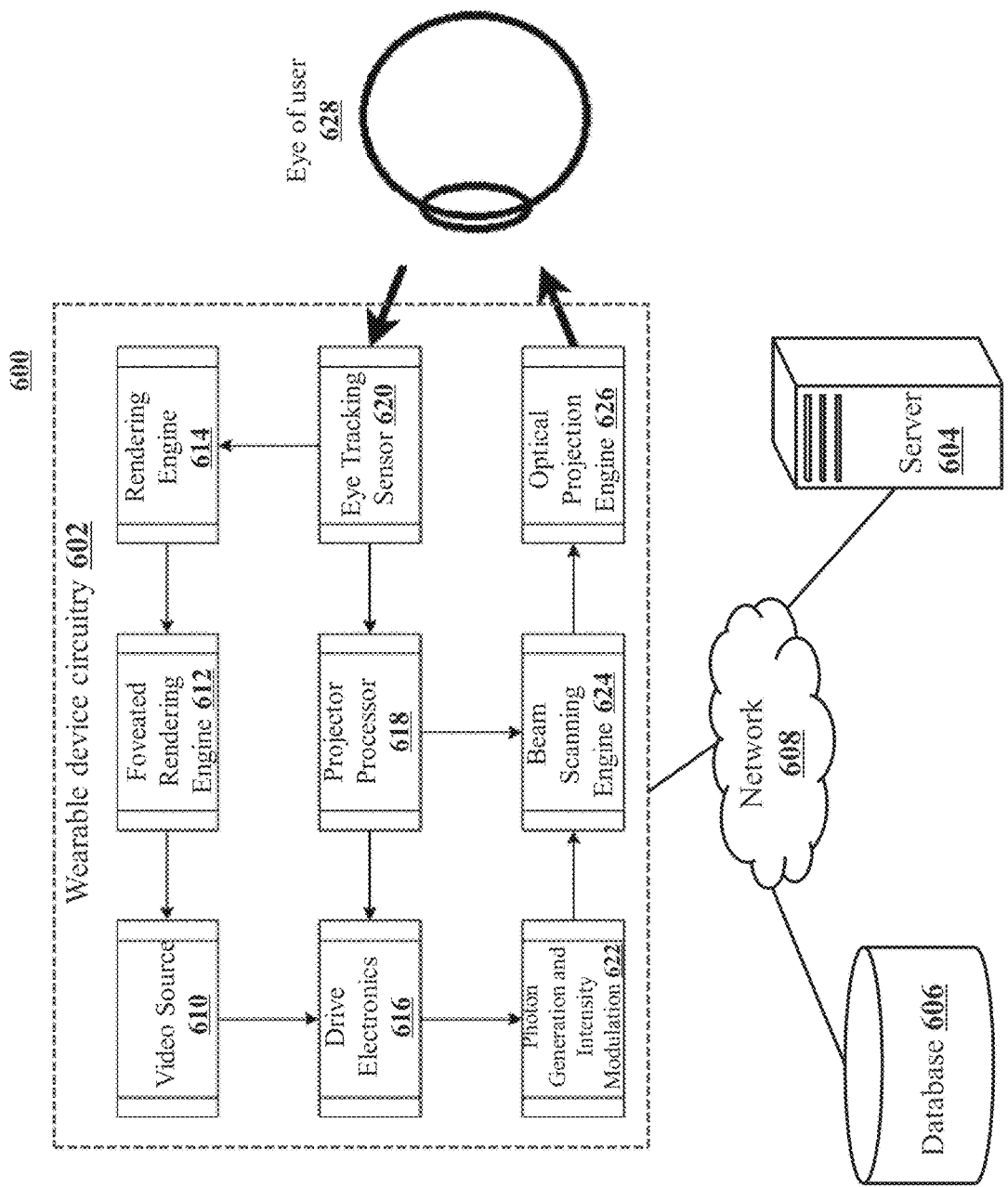

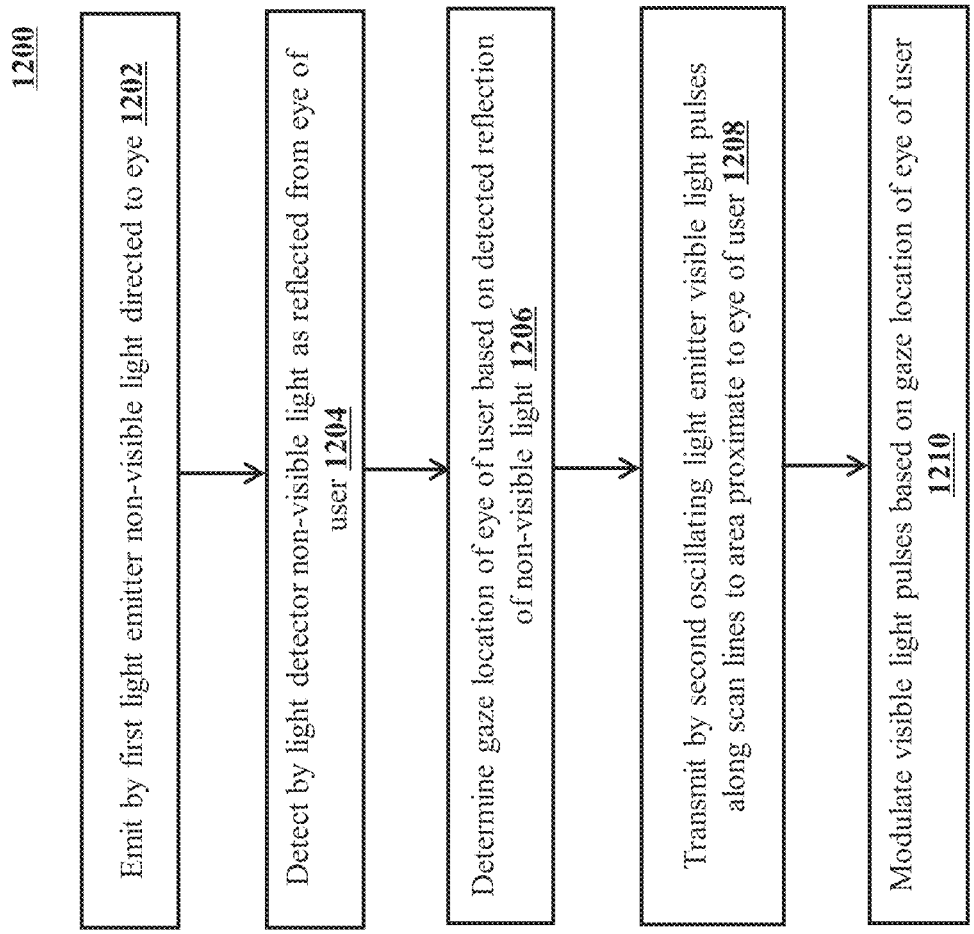

FOVEATED PROJECTION SYSTEM TO PRODUCE OCULAR RESOLUTION NEAR-EYE DISPLAYS

CROSS-REFERENCE TO RELATED APPLICATIONS

This application is a national phase application of PCT/IB2019/001476, filed Apr. 25, 2019, which claims priority to the U.S. Provisional Patent Application Ser. No. 62/662,604, filed Apr. 25, 2018, all of which are incorporated by reference herein.

TECHNICAL FIELD

The subject matter described herein relates generally to displays on electronic devices, and more specifically is directed towards foveated projection systems in a wearable device that adjust pixel resolution at a display screen of the wearable device based on the direction of the eye gaze of the user.

BACKGROUND

Displays on electronic devices that are viewed close to the eyes have to have high fidelity. High fidelity displays are computationally intensive and consume a lot of power. For example, FIG. 1 shows a phone 100 being used in an augmented reality (AR) or virtual reality (VR) arrangement. Although the user sees the display of the phone 100 as augmented by mirrors and beam splitters, the display is close to the human eye and therefore will require a high fidelity (or resolution). The conventional approach is to increase the resolution of the near-eye displays, for example, 8 megapixels (MPs) for each eye.

This conventional approach of creating the high-resolution display screen of the phone 100 or the near-eye devices requires expensive and power-hungry computing resources. Furthermore, the power-hungry computing resources are heavy and require a large footprint for accommodation within the phone 100 or the near-eye devices. Such a large configuration of the phone 100 or the near-eye devices may cause significant user experience issues with ergonomics, high thermal radiation, high power consumption, as well as performance versus power consumption tradeoff problems.

Furthermore, existing processor technologies employed within the phone 100 or the near-eye device have reached limitations on transistor size reductions, making it difficult to create the high-resolution display screen on the phone 100 or the near-eye device. With an ever increasing demand for pixel processing by the phone 100 or the near-eye device, various chipsets within the phone 100 or the near-eye device have to increase the physical footprint once hitting the physical limit of the transistor size reductions to accommodate for the additional computing resources.

At present, there are many problems associated with increasing the physical footprint of the near-eye device to incorporate the additional computing resources. First, increasing the physical footprint of the near-eye device changes its form factor. Second, increasing the physical footprint of the near-eye device increases the cost of production by having to incorporate the additional computing resources. Third, some of the additional computing resources, such as driver technologies to drive illumination diodes on the wearable display of the near-eye device will need to handle very high frame rates to scan out large amounts of pixels. Driver technologies capable of handling such high frame rates are not yet available.

Typically, the brightness of the wearable display screen of the near-eye device also has to be increased when the wearable display screen is paired with the optical elements combiner designs as there is a loss in final optical power from a wearable display screen source. This requires even greater optical power from the wearable display screen source to work well with an environmental lighting, which is typically brighter than the optical power of the wearable display screen source. However, currently available near-eye device, such as eyewear 200, as depicted in the FIG. 2, uses heavy tinting to reduce the environmental lighting so that the optical power of the wearable display screen can project virtual content clearly to the user without being saturated by the environment lighting. But when the eyewear 200 is used with the optical elements combiners with multiple reflections, a blurred image (with ghost images) is displayed on a wearable display 300, as depicted in the FIG. 3, and therefore the user is unable to view the image clearly.

SUMMARY

What is therefore needed is near-eye display that provides a high fidelity viewing to the user while consuming less power. What is further needed is a near-eye display with hardware that may fit in a small form factor such as a wearable device.

Embodiments disclosed herein describe a foveated projection system that generates a high resolution display by concentrating pixels based on the eye gaze of the user. The display has pixels with a lower pitch (i.e., the pixels are closer together) in the position of eye gaze and pixels with higher pitch at other locations in the display. As the arc of human central vision is one degree, the rest of the display where the user is not directly looking may be presented with a lower resolution. As the eyes of the user moves in a different direction, all the pixels are seamlessly moved to concentrate at new portions of the display, which are now in line with a most recent position of the eye gaze of the user. Therefore, a processor may perform intensive full-resolution computations for a fraction of the display and perform less intensive computations for the remaining portion.

To dynamically arrange and rearrange the pixels on the display screen based on the positions of the eye gaze of the user, the processor may trigger a plurality of lasers associated with the wearable device to generate and transmit light pulses onto the display screen. Each light pulse may correspond to one pixel. Each of the plurality of lasers may be configured to trigger in a sequence after a predetermined period of time interval such that a time interval between the production of the different type of pixels become shorter, which may increase an overall number of pixels but reduces a pixel pitch.

In one non-limiting example, instead of all X number of pixels (for instance, 720 pixels) being spread across an entire array of a display screen of a wearable device at all times, most of the pixels (for instance, 80% of pixels) may be concentrated in a first portion of the display screen, which may be in direct line with the current position of the eye gaze of the user. As the position of the eye gaze of the user moves to a second portion of the display screen from the first portion, most of the pixels may then be moved from the first portion and will be concentrated in the second portion. The percentage amount of the pixels to be concentrated in any portion of the display screen may depend on a distance between the eyes of the user and the display screen, a type of the display screen, and a type of the wearable device.

In one embodiment, a system for generating a foveated display is disclosed. The system may include a first light emitter configured to emit a non-visible light directed to an eye; a light detector configured to detect the non-visible light as reflected from the eye; a processor configured to determine a gaze location of the eye based on the detected reflection of the non-visible light; a second oscillating light emitter configured to transmit visible light pulses along a plurality of scan lines to an area proximate to the eye such that the visible light pulses form an image visible to the eye, each visible light pulse corresponding to a pixel of the image; and the processor further configured to modulate the visible light pulses based on the gaze location of the eye, the time interval between the visible light pulses at the gaze location being shorter than the time interval between the visible light pulses at non-gaze locations such that a pixel pitch of the image at the gaze location is shorter than the pixel pitch of the image at non-gaze locations.

In another embodiment, a method for generating a foveated display is disclosed. The method may include emitting, by a first light emitter, a non-visible light directed to an eye; detecting, by a light detector, the non-visible light as reflected from the eye; determining, by a processor, gaze location of the eye based on the detected reflection of the non-visible light; transmitting, by a second oscillating light emitter, visible light pulses along a plurality of scan lines to an area proximate to the eye such that the visible light pulses form an image visible to the eye, each light pulse corresponding to a pixel of the image; and modulating, by the processor, the visible light pulses based on the gaze location of the eye, the time interval between the visible light pulses at the gaze location being shorter than the time interval between the visible light pulses at non-gaze locations such that a pixel pitch of the image at the gaze location is shorter than the pixel pitch of the image at non-gaze locations.

In yet another embodiment, a system may comprise an eye tracking sensor configured to determine a gaze location of an eye; and a laser beam scanning projector configured to project a non-uniform image proximate to the human eye based on the gaze location, the non-uniform image containing pixels with shorter pixel pitch at the gaze location and pixels with longer pixel pitch at non-gaze locations.

In yet another embodiment, a method may include determining, by an eye tracking sensor, a gaze location of an eye; and projecting, by a laser beam scanning projector, a non-uniform image proximate to the human eye based on the gaze location, the non-uniform image containing pixels with shorter pixel pitch at the gaze location and pixels with longer pixel pitch at non-gaze locations.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 6A shows various components of a foveated projection system, according to an embodiment.

FIG. 12 shows a method showing operations of a foveated projection system, according to an embodiment.

DETAILED DESCRIPTION

Figure 1:
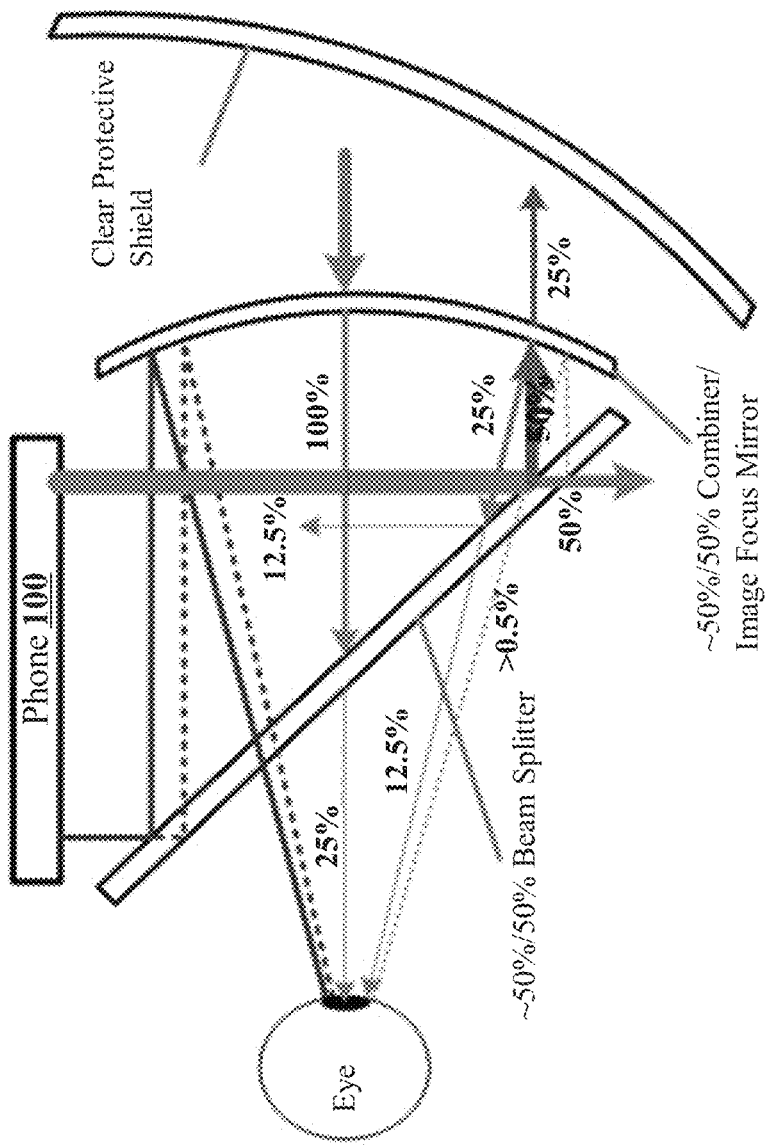
FIG. 1 shows a phone having a conventional optical combiner with multiple reflections.
Figure 2:
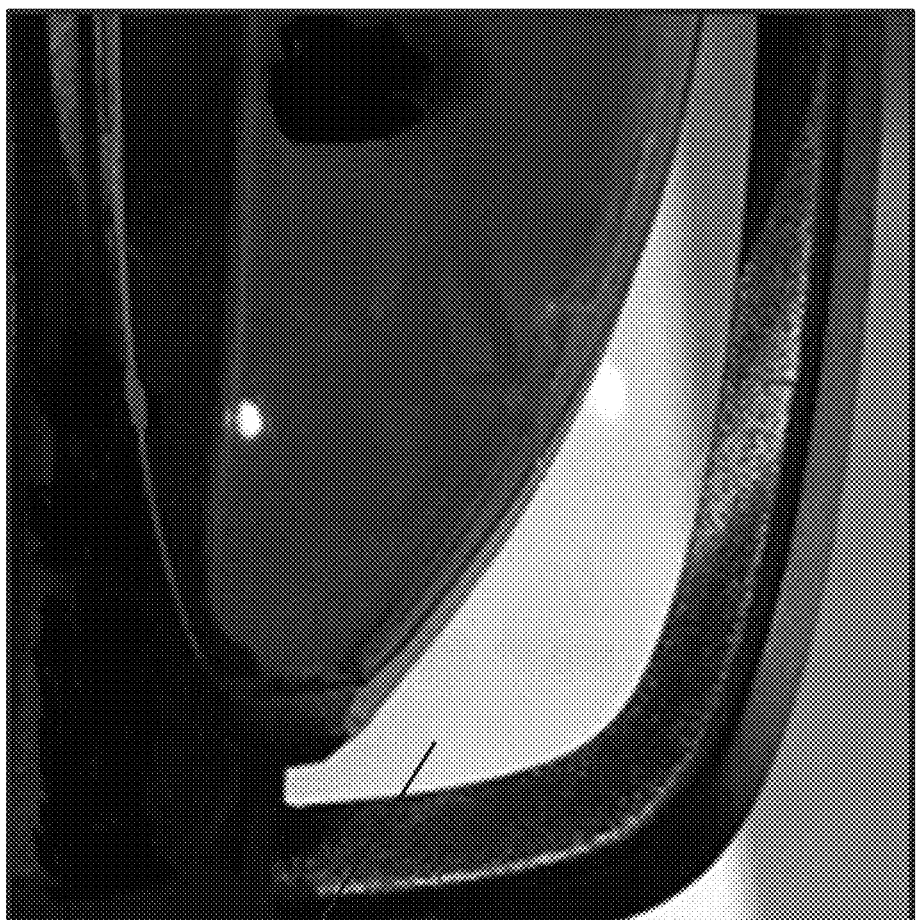
FIG. 2 shows an eyewear having a conventional optical combiner with multiple reflections.
Figure 3:
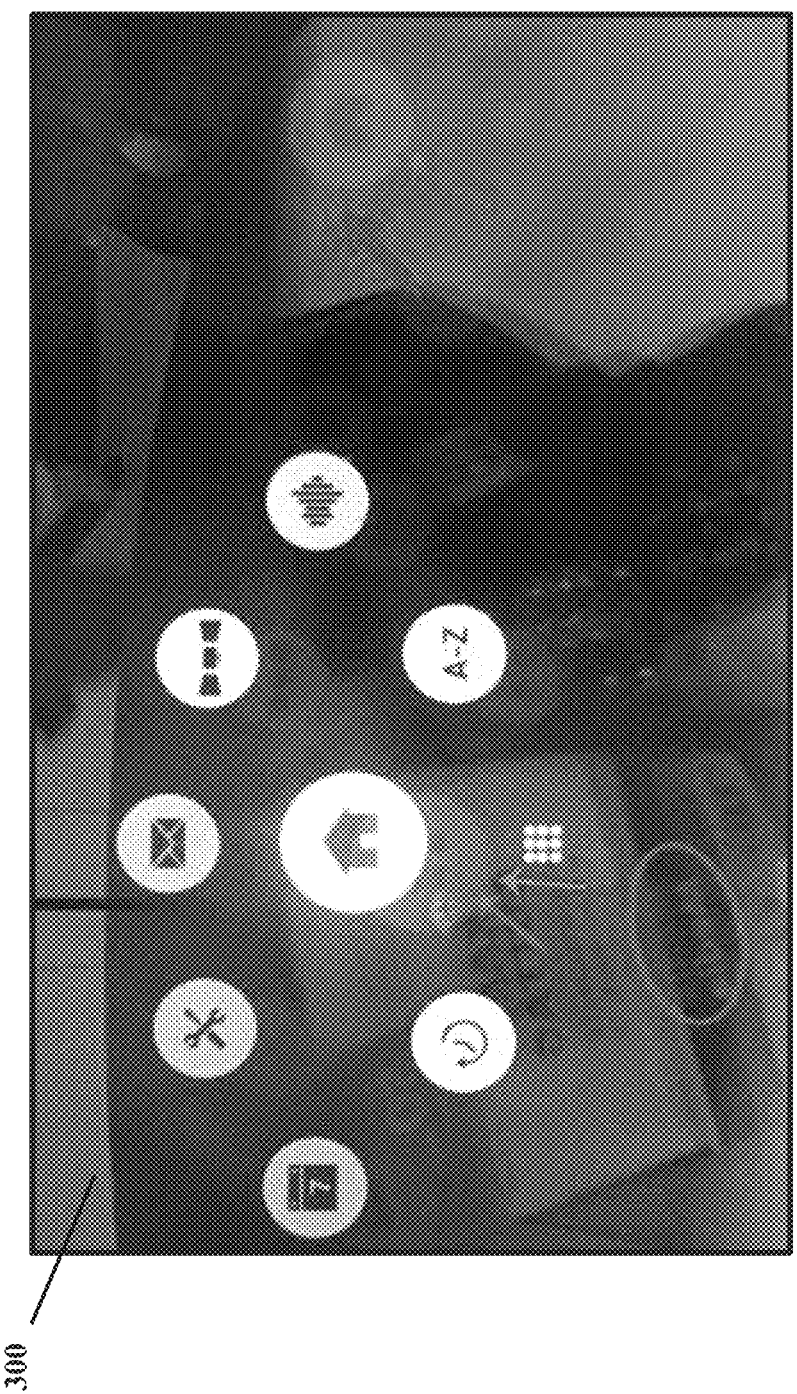
FIG. 3 shows a wearable display of an eyewear having a conventional optical combiner with multiple reflections.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

Embodiments disclosed herein describe near-eye display that based upon the model of human vision. The human eye can see clearly within an arc of one degree. A faraway object, e.g., a television set on the wall, may be within this arc of central vision, and the eye can see everything on the television screen with sufficient clarity. In contrast, only a portion of the nearer objects may be within this arc of central vision. Therefore, the eye can see only a portion of a near-eye display, such as a display on a wearable device. The systems and methods described herein leverage this model of human vision to generate high fidelity (or a high resolution display) while consuming less power. A processor may generate the display with a higher resolution at a location (or position) of the eye-gaze or near to the fovea of the eye with the high concentration of rods and cones. The display therefore may not have a uniform resolution as conventional phones or television sets, but has a non-uniform resolution based upon the model of the human vision. The processor may further track the eye movement and dynamically update the display by the moving the high resolution portion the near-eye display along with the movement of the eye.

Figure 4A:
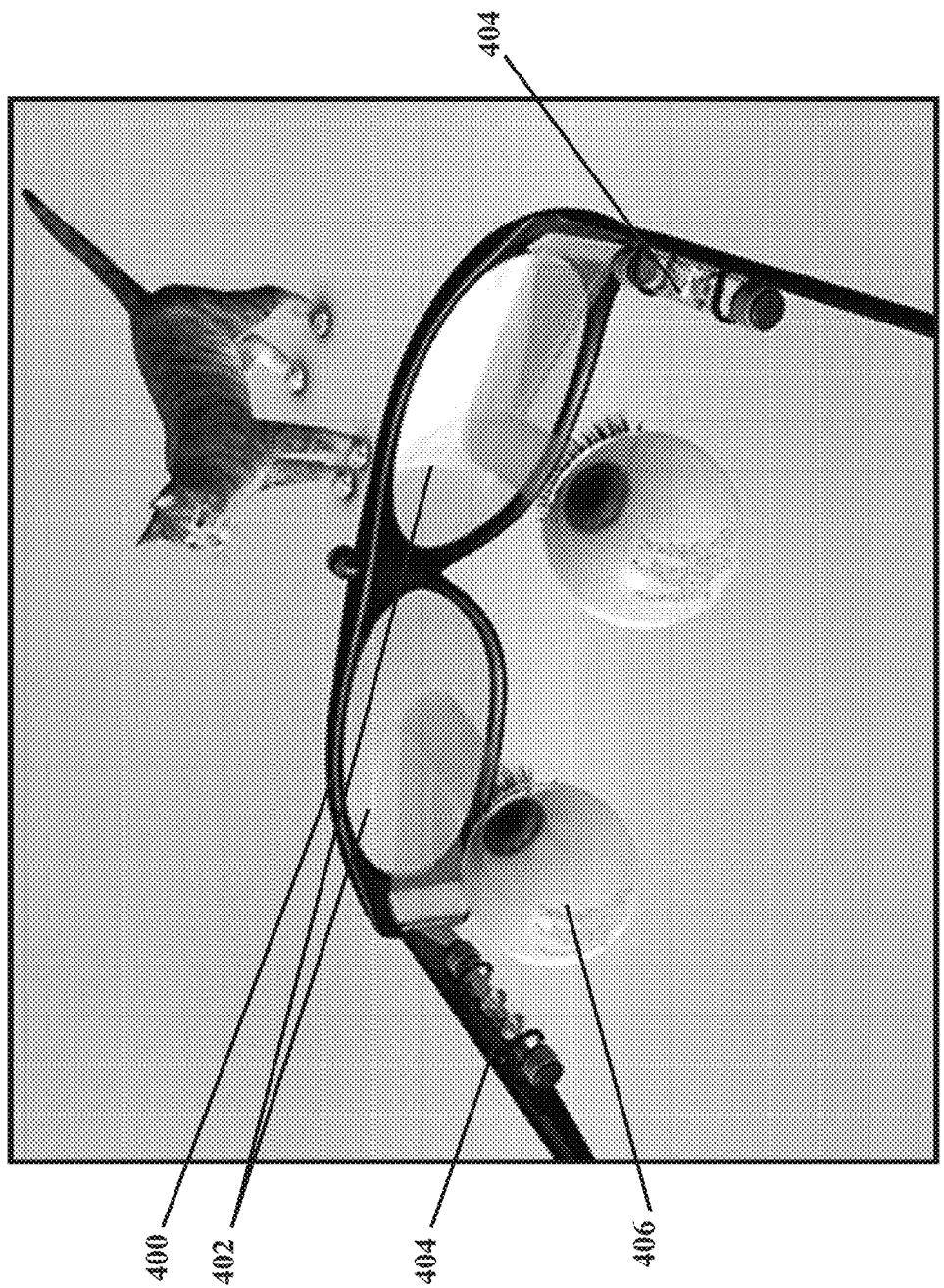
FIG. 4A shows a rear view of a wearable device, according to an embodiment.
Figure 4B:
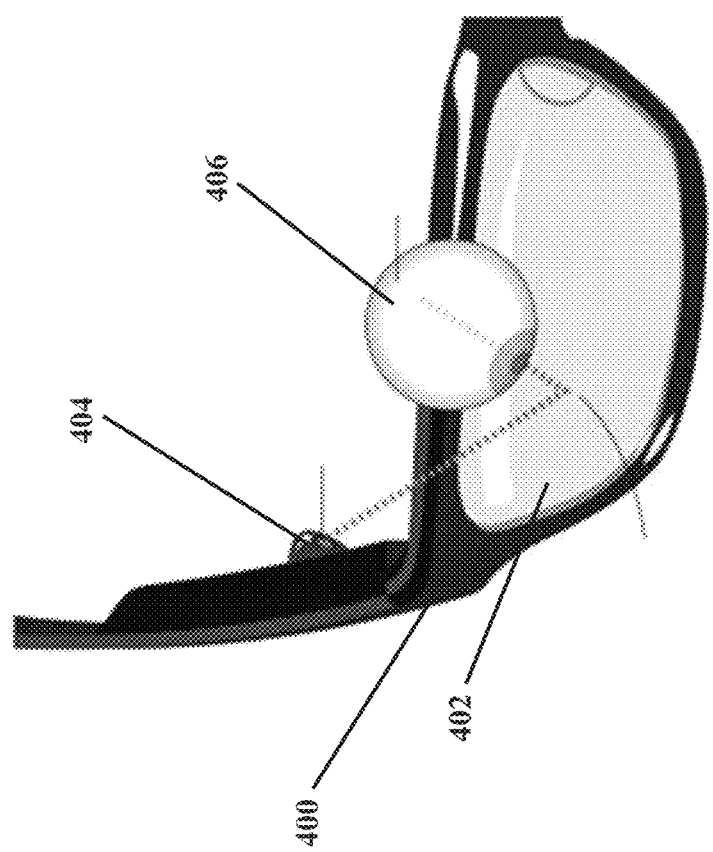
FIG. 4B shows a partial front view of a wearable device, according to an embodiment.
Figure 4C:
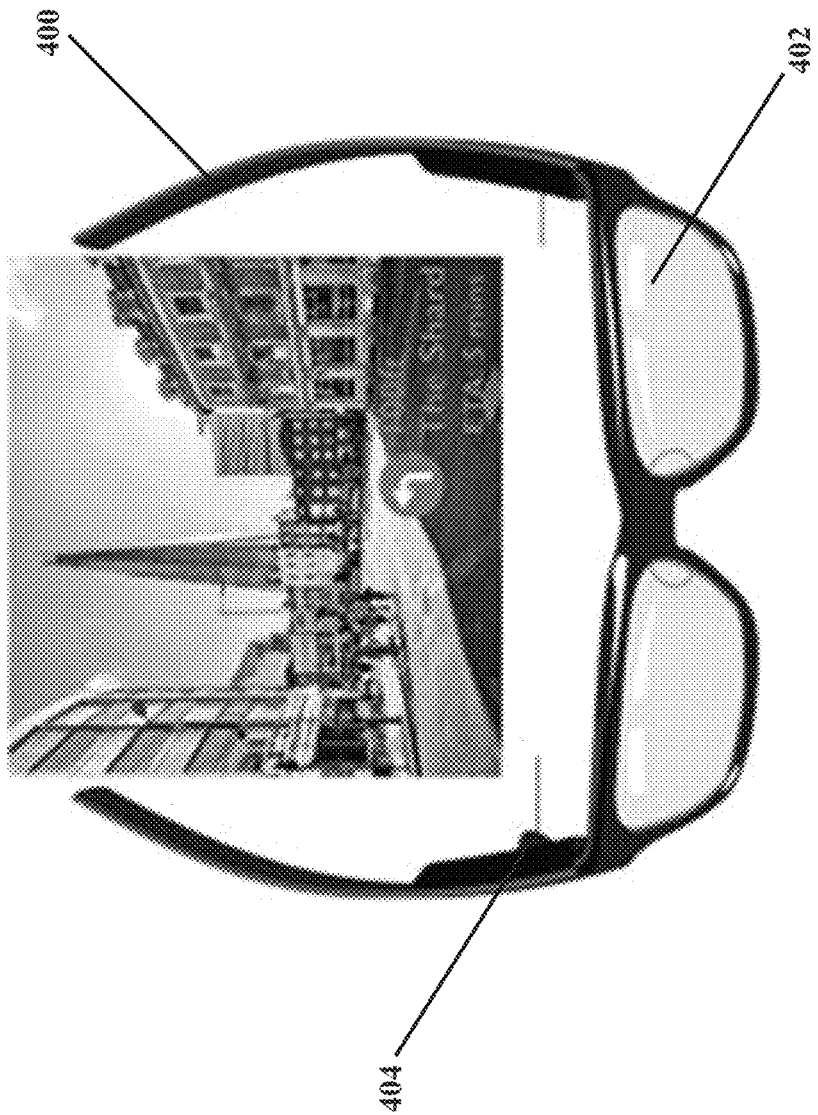
FIG. 4C shows a front view of a wearable device, according to an embodiment.

FIGS. 4A-4C show a wearable device (also referred to as a near-eye device) 400 used by a user. For ease of explanation, the FIGS. 4A-4C shows the wearable device 400 as eyeglasses, however, it should be appreciated that some embodiments may include any suitable wearable device 400 capable of performing various tasks described herein. For example, the wearable device 400 may be a display device in form of glasses, goggles, headset, or any other structure including a frame that supports and incorporates various components of the wearable device 400, as well as serves as a conduit for electrical and other component connections. A software product running on a camera (e.g., an application executing on a mobile device enabled with a camera device) may also be used in association with wearable device 400.

The wearable device 400 may be configured for viewing and interacting with a real world item or a virtual world item, such as with a virtual display of imagery and/or text. For instance, the wearable device 400 may be a part of an augmented reality system, which may be a form of virtual reality that layers virtual information over a live camera feed (using a camera attached on the wearable device 400) into the wearable device 400 or through a smartphone or tablet device giving the user of the wearable device 400 the ability to view three-dimensional text on display lenses 402 of the wearable device 400. The display lenses 402 may be a virtual retinal display. The virtual retinal display may be scanned directly onto the retina of user's eye 406, which may result in bright images displaying text with high revolution and high contrast.

The wearable device 400 may include a lens unit having two or more display lenses 402 connected to a frame. The frame may be an eyeglass frame adapted to be affixed to the user's face. When worn by the user, the display lenses 402 may be located in front of the eyes 406 of the user. In an alternate embodiment, another type of frame may be provided, such as a headset or helmet. In some embodiments, the wearable device 400 may include one display lens or more than two display lenses 402. The display lenses 402 may be formed of a material that may suitably display a projected image or graphic. The display lenses 402 may be appropriately transparent so that the user may see through the display lenses 402.

The display lenses 402 may include one or more cameras, which may be devices for capturing a photographic image or recording a video. The one or more cameras may be placed on at least one of the display lenses 402. The display lenses 402 may further include a liquid crystal display. The display lenses 402 may include an imaging system, which can be implemented with any number of micro display panels, lenses, and reflecting elements to display and project an image. The display panels, lenses, and/or reflecting elements of the imaging system can be implemented with various display technologies, such as implemented with a transparent liquid crystal display or using a projection technology. The projection technology can be implemented using the liquid crystal display with powerful backlights and high optical energy densities. Alternatively, a micro display and/or reflecting element can be implemented using a reflective technology, such as digital light processing and liquid crystal on silicon that reflects external light, which is reflected and modulated by an optical material.

The wearable device 400 may be implemented as an independent, portable device, which may further include communication electronics, transmitters, receivers, cameras, sensors, memory, software, a processor, and/or power sources. The transmitter and the receiver may use communications signals to communicate information relating to each other in the form of signals carrying digital data. The transmitter and the receiver may use communications signals to communicate information relating to the wearable device 400 in the form of signals carrying digital data to a server. The server may be implemented for wired or wireless communication with the wearable device 400. The server and the wearable device 400 may also be implemented with any number and combination of differing components. In addition, the wearable device 400 may be communicatively linked using Bluetooth to a controller.

The wearable device 400 may include a central frame support. The wearable device 400 may further include two side arms extending out of the central frame support. The side arms and the central frame support may be configured to secure to a face of the user through the eyes 406 and ears of the user. The side arms and the central frame support may be made of a rigid material, such as plastic. The side arms and the central frame support may include a solid structure of metallic wiring internally connecting various components of the wearable device 400.

Each side arm of the wearable device 400 may include a housing connected to a mirror. The housing may contain electronic control circuitry 404. The electronic control circuitry 404 may be connected to the mirror. The electronic control circuitry 404 may include a battery to provide power to the wearable device 400. The electronic control circuitry 404 may further include cameras, sensors, light emitters, light detectors, oscillating light emitters, and processors.

Various components of the electronic control circuitry 404 may continuously track an eye gaze of the user wearing the wearable device 400. For example, an emitter may emit a non-visible light such as infrared or ultraviolet that may reach the eye and reflect back to the control circuitry 404. Utilizing the reflection, the electronic control circuitry 404 may determine the position of the eye gaze. Based on the position of the eye gaze, other light emitters emitting visible light of the electronic control circuitry 404 may dynamically adjust pixel resolution at a portion of the display lenses 402 in line with the current position of the eye gaze of the user. As the eye gaze of the user changes position, the high fidelity resolution seamlessly moves from one region of the display lenses 402 to a new region of the display lenses 402.

The wearable device 400 may further include computer-executable instructions, such as a software application, which are executed by a processor to implement embodiments of the wearable device 400. The execution of the software application may result in a configuration of the display lenses 402. The display lenses 402 may then display an image of an object transmitted by wired or wireless technology from a database. The execution of the software application may also result in a selection of a percentage amount of the pixels for concentration in a portion of the display lenses 402 being viewed by the user.

In one embodiment, the percentage amount of the pixels for concentration in any portion of the display lenses 402 being viewed by the user may depend on at least a distance between the eyes of the user and the display lenses 402. When the distance between the eyes of the user and the display lenses 402 is X, then 95 percent of all pixels may be concentrated on a first portion of the display lenses 402, based on the current position of eye gaze of the user. However, when the distance between the eyes of the user and the display lenses 402 is Y, then 75 percent of all pixels may be concentrated on the first portion of the display lenses 402, based on the current position of eye gaze of the user.

In another embodiment, the percentage amount of the pixels for the concentration in any portion of the display lenses 402 being viewed by the user may depend on a medical condition of the eyes of the user. The medical condition of the eyes of the user may be stored in a local memory associated with the wearable device 400. When the medical condition of the eyes of the user is above average, then 80 percentage of all pixels may be concentrated on the first portion of the display lenses 402, which is in line with the current position of eye gaze of the user. However, when the medical condition of the eyes of the user is average, then 88 percentage of all pixels may be concentrated on the first portion of the display lenses 402 based on the current position of eye gaze of the user.

Figure 5:
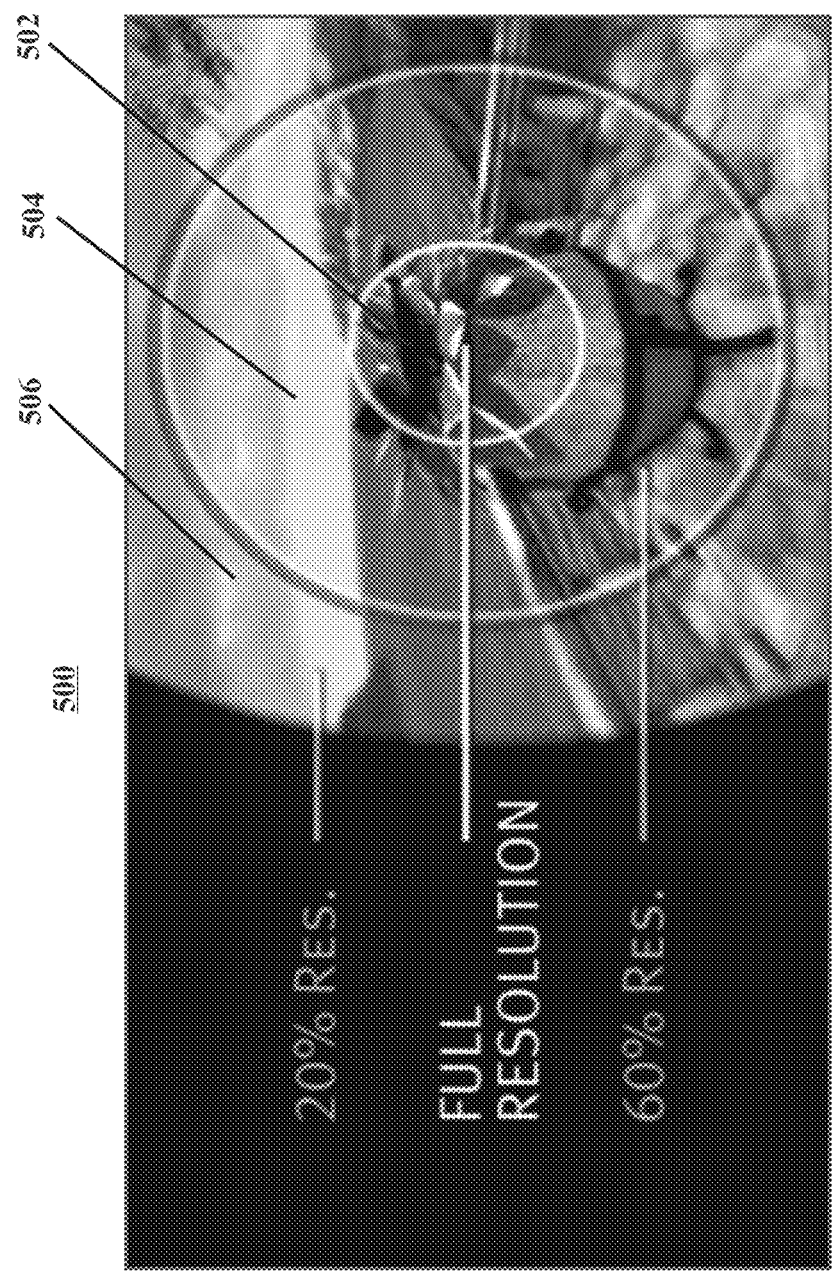
FIG. 5 shows an image viewed by a wearable device, according to an embodiment.

FIG. 5 shows an image 500 viewed by a user on a display screen or display lenses of a wearable device described in the FIGS. 4A-4C. The resolution of different portions of the image 500 may be linked to a current position of an eye gaze of the user with respect to the display screen. For instance, when the user is looking at a particular portion of the image 500, more pixels may be concentrated at that particular portion of the image 500, which may result in a higher resolution of that particular portion of the image 500.

The resolution of the different portions of the image 500 may depend on a number of pixels. The image 500 may depict a snapshot of a central focus 502 of the image 500 at a full resolution. The central focus 502 may be in a direct line with the current position of the eye gaze of the user and thereby include most amount of pixels. The image 500 may further depict a snapshot of a middle focus 504 of the image 500, which is a peripheral region of the image 500 at 60 percent resolution. The middle focus 504 of the image 500 may include fewer pixels as the user is not focused this portion of the image 500. The image 500 may further depict a snapshot of an outer focus 506 of the image 500, which is the peripheral region of the image 500 at 20 percent resolution. The outer focus 506 of the image 500 may include fewer pixels as the user is not focused this portion of the image 500.

When rendering of the image 500 is performed to adjust resolution and pixels based on the current position of the eye gaze of the user, then there is a reduction in overall computational rendering of the image 500 because only a portion of the image 500 has to be rendered for higher resolution and pixels. The reduction in the computation rendering burden may also be applied to compression of the image 500 in order to reduce an overall bandwidth of the image 500 being transferred or stored in a local database. Accordingly, the selective distribution of the pixels in portions of the display lenses in order to achieve higher resolution only in said portions of the display lenses may result in an overall reduction in the use of the computing resources while achieving a desired visual imagery for the eye of the user.

Figure 6B:
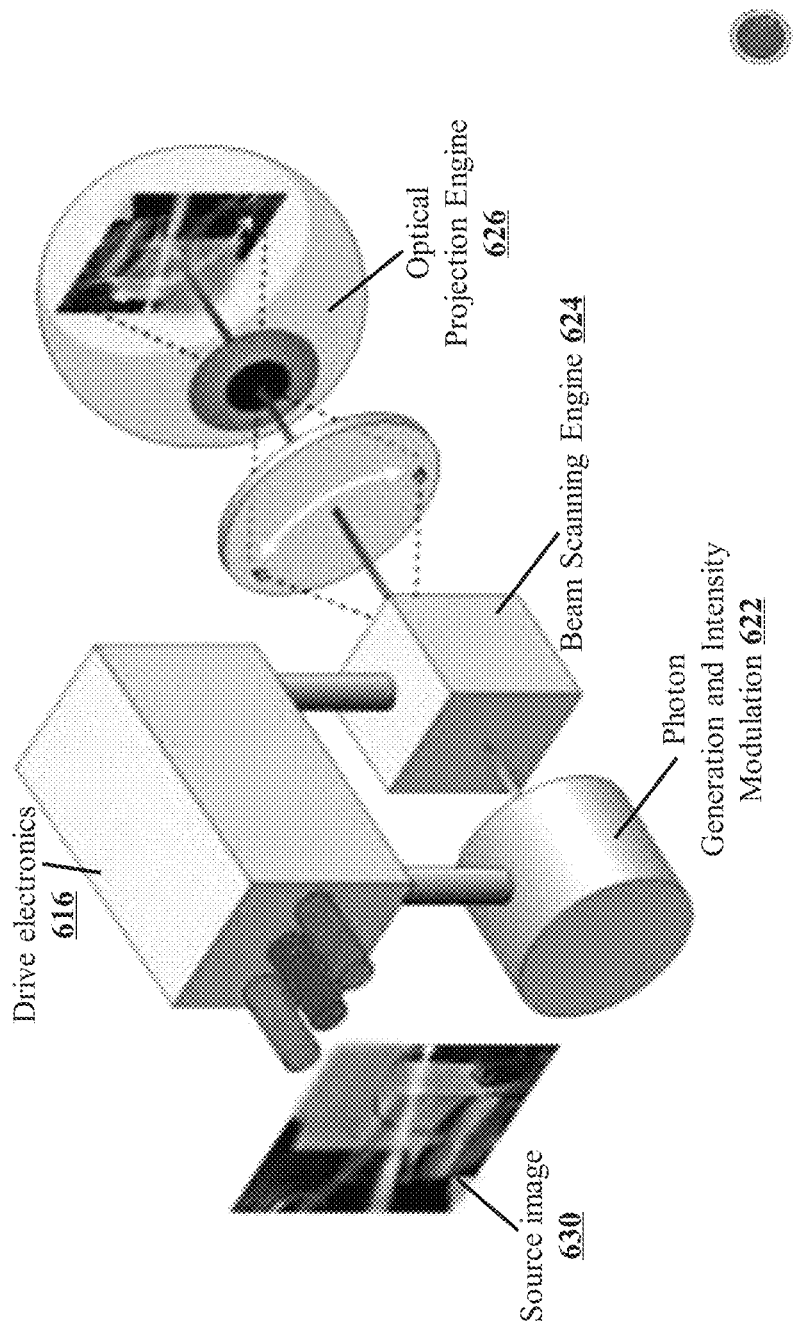
FIG. 6B shows various components of a foveated projection system, according to an embodiment.
Figure 6C:
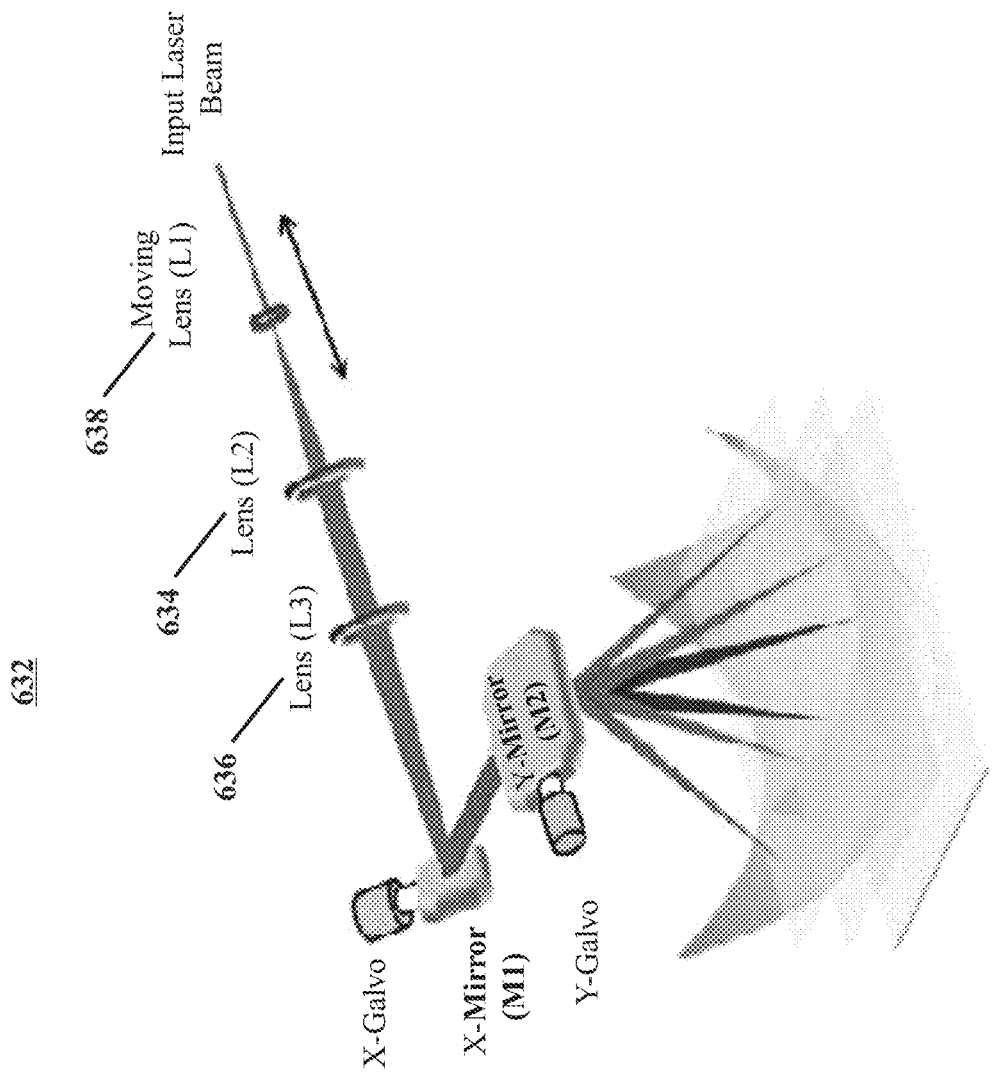
FIG. 6C shows various components of a foveated projection system, according to an embodiment.

FIGS. 6A-6C show various components of a foveated projection system 600. The foveated projection system 600 may be integrated to a wearable device in order to attain a high resolution of objects being presented on lenses of the wearable device, which may result in an optimal visual imagery of the objects for a human eye without an increase in computing resources associated with the wearable device. For this purpose, the foveated projection system 600 may use laser based technology to attain selective concentration of pixels in regions of the lenses where a user is currently viewing, and thus higher resolution is required to view content displayed on those regions of the lenses. The laser-based technology may include laser beam scanners.

While adjusting the pixels in the different regions of the lenses, the foveated projection system 600 may scale its output power intensity to be greater than an outdoor environment lighting in view of the wearable device. The foveated projection system 600 for the wearable device, such as an augmented reality device having a near-eye augmented reality display, may use a tinted lens to dim the outside lighting environment in view of the wearable device. The foveated projection system 600 may also use an electrochromic film or liquid crystal attenuators to darken the entire lenses or selective areas of the lenses, which may require black or opacity. Accordingly, the wearable device having a combination of the laser beam scanners and the lenses attenuator of outdoor lighting may benefit from being able to see an outside world clearly while also seeing a virtual augmented reality overlay.

The foveated projection system 600 may include a wearable device circuitry 602 incorporated within the wearable device, a server 604, and a database 606. The wearable device may be used by a human eye 628. The wearable device circuitry 602 may include a video source 610, a foveated rendering engine 612, a rendering engine 614, drive electronics 616, a projector processor 618, an eye tracking sensor 620, a photon generation and intensity modulation engine 622, a beam scanning engine 624, and an optical projection engine 626.

The wearable device circuitry 602, the server 604, and the database 606 may communicate with each other over the network 608. The network 608 may include, but is not limited to, a private local area network or a public local area network, a wireless local area network, a metropolitan area network, a wide-area network, and Internet. The network 608 may further include both wired and wireless communications, according to one or more standards, via one or more transport mediums. The communication over the network 608 may be performed in accordance with various communication protocols, such as, a transmission control protocol and an internet protocol, a user datagram protocol, and an institute of electrical and electronics engineers communication protocols. The network 608 may further include wireless communications, according to Bluetooth specification sets, or another standard or proprietary wireless communication protocol. The network 608 may further include communications over a cellular network, including, for example, a global system for mobile communications, code division multiple access, and enhanced data for global evolution network.

The foveated projection system 600 may operate or may be implemented in a local computing environment. The foveated projection system 600 may include the wearable device, which may execute various eye tracking tasks and pixel resolution adjustment tasks. The database 606 and application programs associated with the various components of the wearable device circuitry 602 may be stored and executed on local computing resources. Upon the execution of the eye tracking tasks and the pixel resolution adjustment tasks, information having an appropriate resolution is presented on the lens of the wearable device.

The foveated projection system 600 may operate in a cloud-computing environment where the wearable device may be cloud-optimized. The wearable device may execute a software application to generate and transmit a request. The request may be associated with execution of the eye tracking tasks and the pixel resolution adjustment tasks. The software application and the wearable device data and application programs may be stored and executed on a remote cloud-based server 604 accessed over a network cloud. In the cloud-computing environment, a web browser on the wearable device may interface with an application program corresponding to the software application, which is executed on the remote cloud-based server 604. The remote cloud-based server 604 may execute the eye tracking tasks and the pixel resolution adjustment tasks. Upon the execution of the eye tracking tasks and the pixel resolution adjustment tasks, the information having the appropriate resolution is presented on the lens of the wearable device.

The wearable device may transmit credentials from user inputs to the server 604. The server 604 may use the user inputs to authenticate the user. The wearable device may include a number of input devices (e.g., touchscreen) to receive the user inputs, including various types of data inputs. The user inputs and the data inputs may include username, passwords, certificates, and biometrics. The user inputs and the data inputs may allow for the authentication of the user.

The wearable device may include an authentication apparatus, such as a sensor device for facial, iris, retina, eye vein, and/or face vein recognition or other facial feature or facial component recognition that capture images and/or emits sensor waves and generates sensor data associated with face detection, head movement, and/or other facial features of the user, which may be stored on the database 606. The authentication apparatus may further draw upon the information stored in the database 606, such as a look up table to compare and contrast data associated with the user, including data related to information on facial, iris, retina, and/or eye vein information, fingerprints, breath analysis, body odor, voice patterns, etc. of the user. The processing unit may receive camera data and/or sensor data for the facial, the iris, the retina, the eye vein, and/or the face vein recognition or other facial feature from the sensors, and/or fetch stored sensor data from the look up table in the particular storage locations. The processors may use currently captured sensor data of the user to compare with stored sensor and other data of the user to authenticate the user.

The wearable device may include lenses or interactive user interfaces on which the user may interact by means of an input device, such as a touch screen, among others. Each lens may collect data records, such as images of objects from the database 606 and feed the data records to the user. The data records may include information being transmitted between the wearable device and other devices via the network 608.

The wearable device may execute a software application running on an operating system of the wearable device for receiving and manipulating data records stored in the database 606. The software application may display interactive icons or buttons on the lens. The triggering of the icons may generate a screen divided into a plurality of portions on the lens. A first portion of the screen may present a questionnaire associated with various questions. The user may submit answers to the questions. A second portion of the screen may provide a brief text box (for example, a text box with a pre-defined number of characters) having an expandable text capture capability to capture the user's explanation of a request. The request may be a search query for an image of an object. The text box may include pre-filled selections identifying common requests for the user to drag and select. The text box may include pre-filled request selections with the processor moving the most likely requests to a top of a list of options based on the analysis of the previous requests by the user. The processor may continually learn and assess using the information associated with the previous requests of the user.

The wearable device may include a wearable device circuitry 602. The wearable device circuitry 602 may include the video source 610, the foveated rendering engine 612, the rendering engine 614, the drive electronics 616, the projector processor 618, the eye tracking sensor 620, the photon generation and intensity modulation engine 622, the beam scanning engine 624, and the optical projection engine 626.

In operation, the eye tracking sensor 620 may continually track a current position of the eye 628 of the user while the user is viewing the lenses of the wearable device. Based on the current position of the eye of the user with respect to the lenses, the eye tracking sensor 620 may obtain gaze and pupil location of the eye 628 of the user. The eye tracking sensor 620 may store the current position of the eye 628, and the gaze and pupil location of the eye 628 of the user in a local memory associated with wearable device circuitry 602 or the database 606 associated with wearable device. The eye tracking sensor 620 may transmit location coordinates of the gaze and pupil location to an application processor of the rendering engine 614. The eye tracking sensor 620 may transmit location coordinates of the gaze and pupil location to the projector processor 618.

The application processor of the rendering engine 614 may obtain content (for example, an image) from the local memory or the database 606 as requested by the user. The application processor of the rendering engine 614 may execute one or more rendering algorithms to render the image to be displayed on the lenses of the wearable device. At the same time, when the rendering engine 614 is rendering the image or at a different time, the foveated rendering engine 612 may execute one or more foveated rendering algorithms to optimize resolution of the image being displayed on the lenses of the wearable device such that the rendering workload of the rendering engine 614 is reduced.

Upon the execution of the one or more foveated rendering algorithms, the foveated rendering engine 612 may communicate with the projector processor 618 to optimize the image being displayed on the lenses of the wearable device. The projector processor 618 may process information associated with the location coordinates of gaze and pupil location received from the eye tracking sensor 620. The projector processor 618 may also execute one or more processing algorithms, such as one or more foveated projection algorithms to reduce overall resolution required to project the image on the lenses of the wearable device. The projector processor 618 may determine the resolution of the image that may be presented on the lenses of the wearable device based on a field of view of the user. The field of view of the user may be associated with the location coordinates of gaze and pupil location of the eye of the user with respect to the lenses. The projector processor 618 may control or trigger the drive electronics 616 to extract the image from the local memory for display the image on the lenses. The video source 610 may generate the image after rendering, and may store the image in the local memory from where the image may be extracted by the components of the drive electronics 616.

The drive electronics 616 may transmit signals to drive one or more lasers of the photon generation and intensity modulation engine 622 to create photons or light pulses at varying or fixed modulated frequencies while also modulating their respective laser intensities. The drive electronics 616 may emit generated photons or light pulses onto a scanning device, such as a 2D MEMS mirror of the beam scanning engine 624. The scanning device may reflect the photons or the light pulses at varying angles of oscillation depending on a time of incidence of the lasers and angular position of the scanning device. The time of incidence of the lasers and/or the angular position of the scanning device may be selected based on the field of view of the user. The optical projection engine 626 may execute projection algorithms on the image displayed on the lenses to alter resolution at specific region of the image through photons/light pulses and varying optical properties, such that the specific region of the image that is within the field of view of the user is clearly viewable by the eye of the user at a very high resolution. An optical light path may be directed to a retina of the eye for more clearly viewing the specific region of the image displayed on the lenses. The content displayed in the specific region of the image displayed on the lenses may be visible to the user at a high resolution as most of pixels are concentrated in the specific region of the image, while the content displayed in other regions of the image displayed on the lenses may be a lower resolution as fewer pixels are present in the other regions of the image.

The eye tracking sensor 620 may continually perform the eye tracking of the user for managing resolution of a next image frame being displayed on the lenses of the wearable device. The components of the wearable device circuitry 602 may also continually execute one or more prediction algorithms and filter frame filtering algorithms in order to render the image to adjust resolution and pixels associated with the image based on a current position of the eye gaze of the user.

An eye tracking sensor 620 may be associated with the video source 610, the rendering engine 614, the drive electronics 616, the projector processor 618, the photon generation and intensity modulation engine 622, the beam scanning engine 624, and the optical projection engine 626. The eye tracking sensor 620 may further be associated with an eye-tracking module, which may be implemented as a software module running on the associated hardware and configured to receive command data from a processor of the wearable device or the server 604, process the command data into the hardware operation data, and provide the hardware operation data to an eye-tracking sensor module. The eye-tracking module may be configured to receive the ocular sensor data from the eye-tracking sensor module, process the ocular sensor data to generate the ocular engagement data, and provide the ocular engagement data to the processor. The ocular engagement data may include one or more metrics characterizing the level of engagement of user with the content being displayed via the lenses. In an example, the ocular engagement data includes data describing whether the gaze of the user is directed toward the content displayed via the lenses. In these embodiments, the hardware operation data may include instructions for the hardware operation, such as instructions to activate eye tracking sensor 620, to begin to track the gaze of the user, to stop tracking the gaze of user, and the like.

The eye-tracking sensor module may be implemented as software configured to control associated hardware, receive hardware operation data from the eye-tracking module, interact with the user in order to generate the ocular sensor data, and provide the ocular sensor data to the eye-tracking module. The ocular sensor data may include data describing the movement of the eyes of the user. In one example, the eye-tracking sensor module may be implemented as software configured to control a camera hardware (e.g., a camera pair, not shown) included within the wearable device, which is configured to determine the position of the gaze of the user. In this example, the ocular sensor data may include the length of stare of the user on one or more regions of the content being displayed via the lenses, whether the user is looking at one or more portions of the content being displayed via the lenses, and the path of the gaze of the user as the user views the content being displayed via the lenses. The processor may then use currently captured ocular sensor data to increase or decrease the resolutions and pixels of the content being displayed on the lenses.

The eye-tracking module may utilize sensor or camera data to determine the gaze of the user. A light (e.g., infrared) may be reflected from the user eye, and a video camera or other sensor may receive the conical reflection. The eye-tracking module may process and analyze the ocular sensor data of the user to determine eye rotation of the user from a change in the light reflection. A vector between a pupil center of the user and the conical reflections of the user may be used to compute a gaze position of the user. Eye movement data of the user may be based upon a saccade and/or a fixation, which may alternate. The fixation may maintain a visual gaze on a single location on the lenses, and it can be a point between any two saccades. The saccade may be a simultaneous movement of both eyes of the user between two phases of fixation in the same position.

The eye-tracking module may use a dark-pupil technique, whereby if the illumination source is offset from the optical path, then the pupil may appear dark as the retro reflection from the retina of the user is directed away from the camera. The eye-tracking module can use a bright-pupil technique, whereby if the illumination is coaxial with the optical path, then the eye of the user may act as a retro reflector as the light reflects off the retina creating a bright pupil effect.

The camera or the sensor may track eye image features (e.g., retinal blood vessels) and follow the features as the eye of the user rotates. The eye tracking data may be obtained in a manner that is non-invasive. The camera or sensor may identify a location of an iris of the user or pupil of the user based on the circular shape or by detection an edge. The movement of the iris or pupil of the user may then be detected. The processor may use currently captured iris/pupil data to increase or decrease the resolutions and pixels of the content being displayed on the lenses.

A rendering engine 614 may be associated with the video source 610, the drive electronics 616, the projector processor 618, the eye tracking sensor 620, the photon generation and intensity modulation engine 622, the beam scanning engine 624, and the optical projection engine 626. The rendering engine 614 may include an application processor. The application processor of the rendering engine 614 may execute one or more rendering algorithms on the content to be displayed on the lenses. The rendering engine 614 may obtain the content from the local memory or the database 606 based on the request from the user, render the content, and then display the content on the lenses of the wearable device.

A foveated rendering engine 612 may be associated with the video source 610, the rendering engine 614, the drive electronics 616, the projector processor 618, the eye tracking sensor 620, the photon generation and intensity modulation engine 622, the beam scanning engine 624, and the optical projection engine 626. The foveated rendering engine 612 may include an application processor. The application processor of the foveated rendering engine 612 may execute one or more foveated rendering algorithms on the content to be displayed on the lenses to optimize resolution of the content being displayed on the lenses.

A video source 610 may be associated with the foveated rendering engine 612, the rendering engine 614, the drive electronics 616, the projector processor 618, the eye tracking sensor 620, the photon generation and intensity modulation engine 622, the beam scanning engine 624, and the optical projection engine 626. The video source 610 may include an imaging device having a camera. The camera may be an optical instrument for recording or capturing images within the area, which may be stored locally, transmitted to another location, or both. The images may be individual still photographs or sequences of images constituting videos or movies of objects and users within the area. The camera may use an electronic image sensor, such as a charge coupled device or a sensor to capture images within the area, which may be transferred or stored in a memory or other storage inside the camera. The video source 610 may store the images in the local memory or the database 606.

A projector processor 618 may be associated with the foveated rendering engine 612, the rendering engine 614, the drive electronics 616, the eye tracking sensor 620, the photon generation and intensity modulation engine 622, the beam scanning engine 624, and the optical projection engine 626. The projector processor 618 may include a processing unit, and a non-transitory machine-readable storage medium. The processing unit may include a processor with a computer-readable medium, such as, a random access memory coupled to the processor. The projector processor 618 may execute algorithms or computer executable program instructions, which may be executed by a single processor or multiple processors in a distributed configuration. The projector processor 618 may be configured to interact with one or more software modules of a same or a different type operating within the system 100.

Non-limiting examples of the processor may include, but not limited to, a microprocessor, an application specific integrated circuit, and a field programmable object array, among others. The projector processor 618 may be capable of executing various tasks. Non-limiting examples of the projector processor 618 may include a desktop computer, a server computer, a laptop computer, a tablet computer, a mobile phone, a watch, and the like.

Drive electronics 616 may read and process the image for presenting the image on the lenses. The drive electronics 616 may further control modulation, intensities, and pulsing of the lasers of the photon generation and intensity modulation engine 622. The drive electronics 616 may determine a type of the image based on processing of the image. When the image is an RGB image, the drive electronics 616 may activate and modulate three lasers of the photon generation and intensity modulation engine 622 with colors RED, GREEN, BLUE. The three lasers may then generate light pulses, which may optically produce a pixel. The drive electronics 616 may precisely perform optical alignment, which may combine the three-color wavelengths to align the pixel to a point source in the image. The steering of the laser beam(s) of the lasers by the drive electronics 616 may be one-dimensional, such a horizontal scanner and vertical scanner separately, or two dimensional, where both horizontal and vertical scanners are on one scanning device. To control the scanning motion, the scanners of the beam scanning engine 624 may use a rotary encoder and control electronics that provide, for a desired angle or phase, the suitable electric current to a motor or a galvanometer. A software system may control the scanning motion and, if 3D scanning may be implemented, the collection of the measured data in the image. In order to position the laser beam in the two-dimensions, it is possible either to rotate one mirror along two-axis or to reflect the laser beam onto two closely spaced mirrors, which are mounted on an orthogonal axes. Each of the two flat or polygonal mirrors may then be driven by a galvanometer or by an electric motor. Some scanners may be required to be positioned in the three-dimensions to allow focusing of the laser beam onto the lenses. This is achieved with focus tunable lens system, which may be called a focus shifter or "z" shifter.

A beam scanning engine 624 may include a laser beam scanning projector, which may be used to raster an image on the retina through direct ocular coupling or reflection optical source(s). The beam scanning engine 624 may be MEMS (Micro Electro Mechanical System) mirror. The MEMS mirror may be a small solid-state mirror (e.g., a mirror on a chip) actuated by micro-size motors in one or two dimensions. A laser beam pointed at the MEMS mirror may be precisely deflected and steered by the MEMS mirror to reach a target point in the lenses at a specific time. The MEMS mirror may deflect the laser beams to optical scanning angles at high speeds in both axes.

The beam scanning engine 624 may be a three-axis scanning mirror system 632, as depicted in the FIG. 6C. The three-axis scanning mirror system 632 may include a mirror, which may be the scanning mirror instead of a larger galvo-mirror. The scanning mirror system 632 may further include lens L2 634 and lens L3 636, which may be fixed collimating lenses. The scanning mirror system 632 may further include lens L1 638, which may move to alter a focal distance of the laser source. The variation with the lens L1 638 may associate with the laser points, which are of different "z" coordinates or spatial z-axis depth that creates a 3D projection source on the lenses.

A server 604 is a computing device comprising a processing unit. The processing unit may include a processor with computer-readable medium, such as, a random access memory coupled to the processor. The server 604 may be running algorithms or computer executable program instructions, which may be executed by a single processor or multiple processors in a distributed configuration. The server 604 may be configured to interact with one or more software modules of a same or a different type operating within the foveated projection system 600.

Non-limiting examples of the processor may include a microprocessor, an application specific integrated circuit, and a field programmable object array, among others. Non-limiting examples of the server 604 may include a server computer, a workstation computer, a tablet device, and a mobile device (e.g., smartphone). For ease of explanation, FIG. 6A shows a single computing device functioning as the server 604. However, some embodiments may include multiple computing devices capable of performing the network monitoring tasks described herein.

The server 604 may be coupled to the wearable device and the database 606 via the network 608. The server 604 may be coupled to the wearable device circuitry 602. The server 604 may directly or indirectly communicate with the video source 610, the foveated rendering engine 612, the rendering engine 614, the drive electronics 616, the projector processor 618, the eye tracking sensor 620, the photon generation and intensity modulation engine 622, the beam scanning engine 624, and the optical projection engine 626.

The server 604 may generate and execute a first set of instructions to the components of the wearable device for tracking the eye gaze of the user wearing the wearable device. The server 604 may receive the information associated with the eye gaze of the user from the wearable device. The server 604 may process the information associated with the eye gaze of the user received from the wearable device to determine a region in the lenses that may be viewed by the user. The server 604 may generate and execute a second set of instructions to the components of the wearable device to transmit light pulses onto the lenses such that more pixels are being placed in the region of the lenses that may be viewed by the user. The user may then be able to view the content displayed in the region at high resolution.

A database 606 may be capable of storing data records in a plain format and an encrypted version. The data records may include information associated with the wearable device. The database 606 may be in communication with a processor of the server 604 and the wearable device. The processor may be capable of executing multiple commands of the foveated projection system 600. The database 606 may be integral to the wearable device. The database 606 may be a separate component in communication with the wearable device. The database 606 may be integral to the server 604. The database 606 may be a separate component in communication with the server 604. Alternatively, the database 114 may have a logical construct of data files and records, which are stored in a non-transitory machine-readable storage media, such as, a hard disk or memory, controlled by software modules of a database program (e.g., SQL), and a database management system that executes the code modules (e.g., SQL scripts) for various data queries and management functions.

A memory of the database 606 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, and the like. Non-limiting examples of memory implementations may include, but are not limited to, a random access memory, a read only memory, a hard disk drive, a secure digital card, a magneto-resistive read/write memory, an optical read/write memory, a cache memory, or a magnetic read/write memory. The memory of the database 606 may be a temporary memory, meaning that a primary purpose of the memory is not long-term storage. Examples of the volatile memories may include dynamic random access memories, static random access memories, and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories or electrically erasable and programmable memories.

Figure 7:
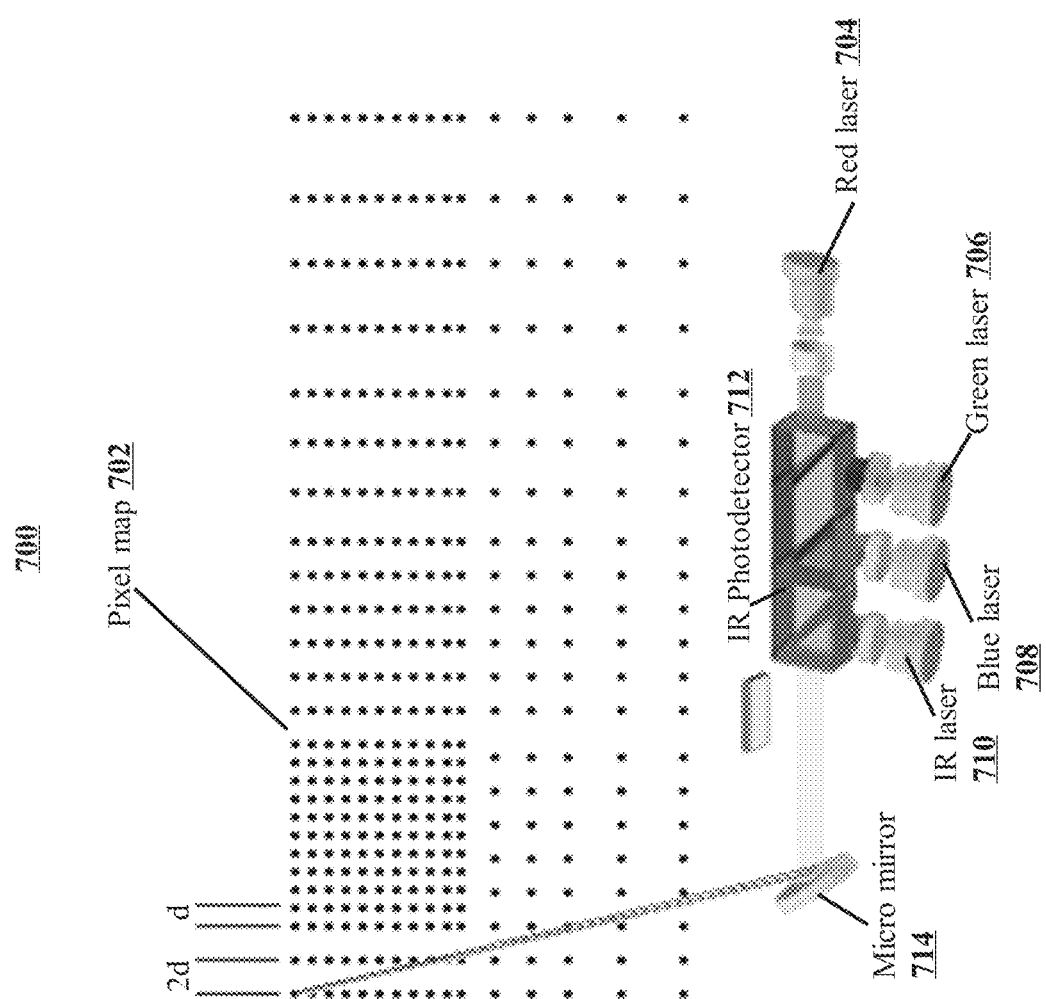
FIG. 7 shows an example of a foveated laser scanning projection device of a foveated projection system, according to an embodiment.

FIG. 7 shows an example of a foveated laser scanning projection device 700 of a foveated projection system. The foveated projection system may include different lasers, such as a red laser 704, a green laser 706, a blue laser 708, and an IR laser 710. The foveated projection system may further include IR photodetector 712 and micro mirror 714. The foveated projection system may use an eye tracking sensor to monitor gaze/pupil location of each eye of a user using a wearable device. The eye tracking sensor may track an exact location of the eye of the user at high speeds and accuracy when the user is viewing content, such as an image on lenses of the wearable device. The eye tracking sensor may transmit the eye position/predicted eye position of the user to a rendering engine associated with an application processor. The eye tracking sensor may control the application processor for varying pixel pitches of the image displayed on the lenses of the wearable device.

The application processor may be configured for presenting the image on the lenses via the foveated laser scanning projection device 700. The application processor may execute foveated rendering algorithms and optimization algorithms on the image to reduce an overall computational and bandwidth loads on the foveated projection system while rendering the image. The application processor may execute compression algorithms to compress the image at varying levels of resolution, which is mapped to perceived visual fidelity of the user. The pixel pitch is a distance from the center of one pixel to a center of the next pixel, and is a limiting factor in resolution. As a result, a pixel map 702 associated with the image may depict pixel densities distribution across the image to reduce overall burden of computing resources. For example, a first region in the pixel map 703 may have a pixel pitch of d and other regions may have a pixel pitch of 2d. Therefore, pixels in the first region are more densely packed than the pixels in the other regions.

Figure 8:
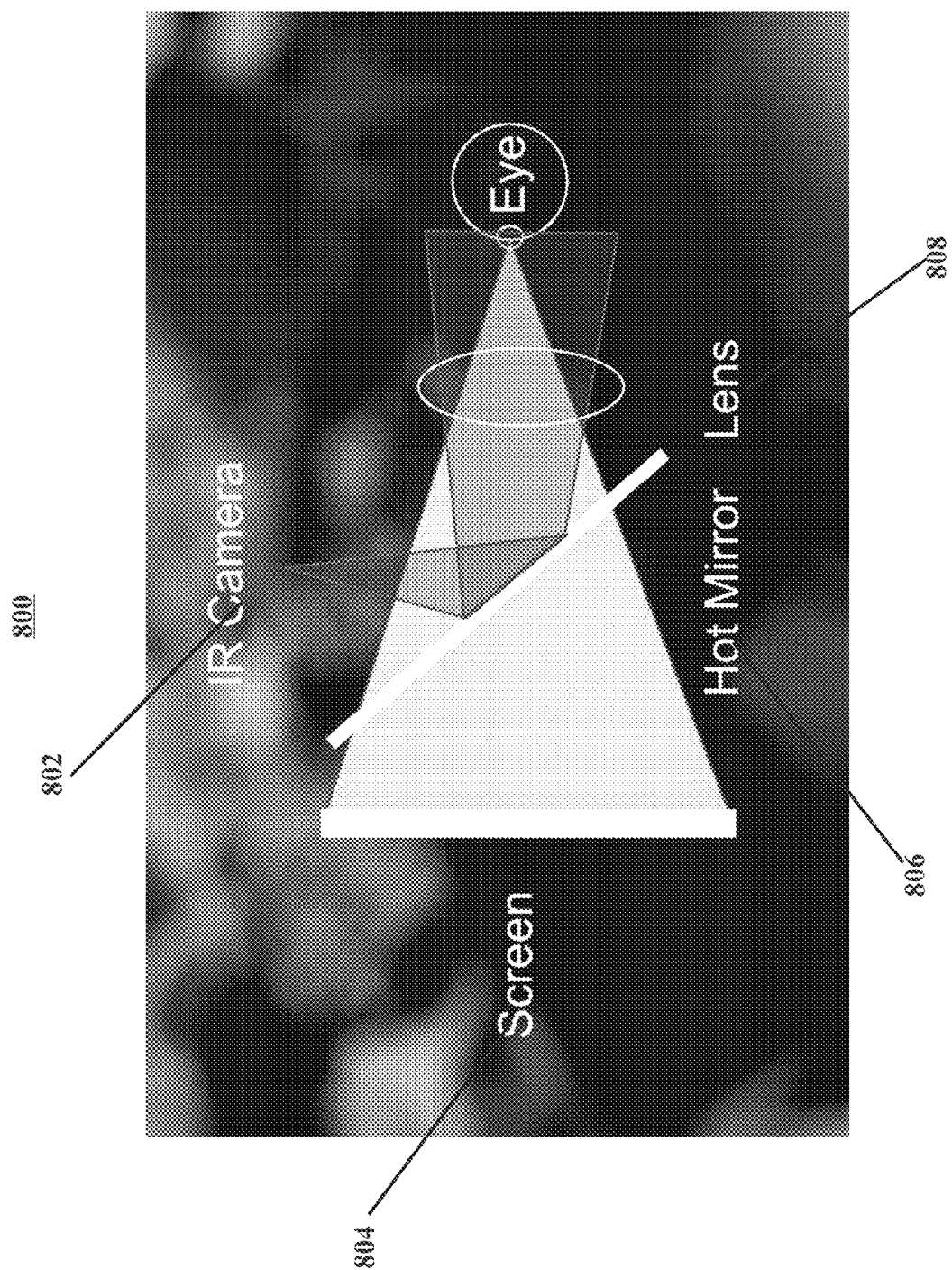
FIG. 8 shows components of a foveated projection system, according to an embodiment.

FIG. 8 shows components of a foveated projection system 800. The foveated projection system 800 may include IR camera 802, a screen 804, a hot mirror 806, and lens 808. The foveated projection system 800 may be an inertial measurement system, which may be used to track the eye movement of a user using a wearable device. The foveated projection system 800 may utilize gaze/eye tracking technologies to track the focal/gaze views of the user. A non-limiting example of an eye tracking technology may include an eye tracking sensor, which may be associated with a direct view or an indirect view of the eye of the user through a reflection source.

The eye tracking sensor may include the IR camera 802 and IR emitters to track the gaze of the uses across a field of view of the foveated projection system 800. The eye tracking technology may be fast enough to optimize for latency of an augmented reality system associated with the wearable device. Optimizing for latency may enable photo latency to approach 0 ms through either perceived latency reduction or actual latency reduction. The eye tracking technology may also be used to predict the gaze of the user in advance of final eye movement of the user. The prediction of the gaze of the user may allow for optimizing a motion of the user to photon latency pipeline in order to create reduced perceived latency while actual latency may be higher.

Figure 9:
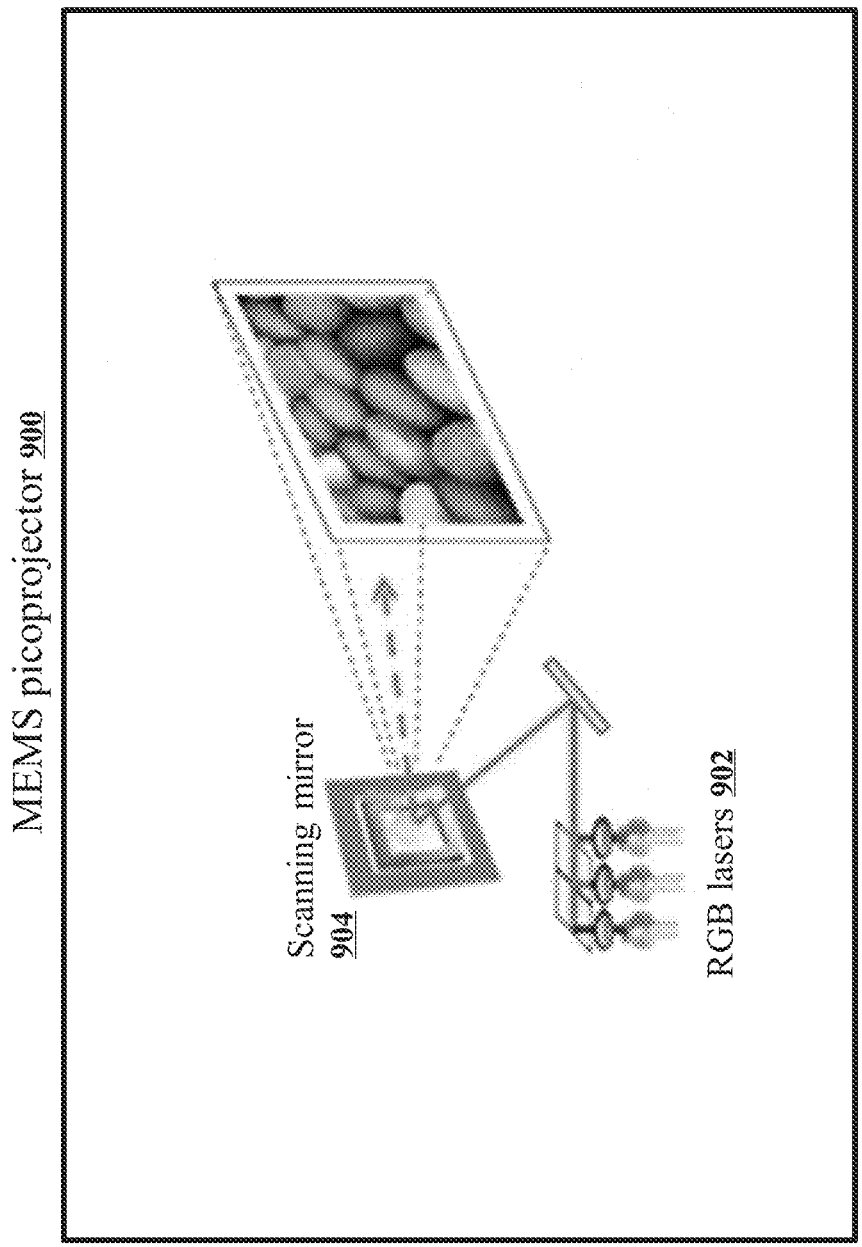
FIG. 9 shows components of a micro-electro-mechanical system (MEMS) picoprojector, according to an embodiment.

FIG. 9 shows components of a micro-electro-mechanical system (MEMS) picoprojector 900. The MEMS picoprojector 900 may include RGB lasers 902 and scanning mirror 904. The RGB lasers 902 may emit RGB laser beams, which are combined into a single spot. A processor may control the RGB lasers 902 to individually mix color emitted by the RGB lasers 902 on a pixel by pixel level. The scanning mirror 904 may scan a laser spot to form an image, which would be focus free and requires no projection lens.

Figure 10:
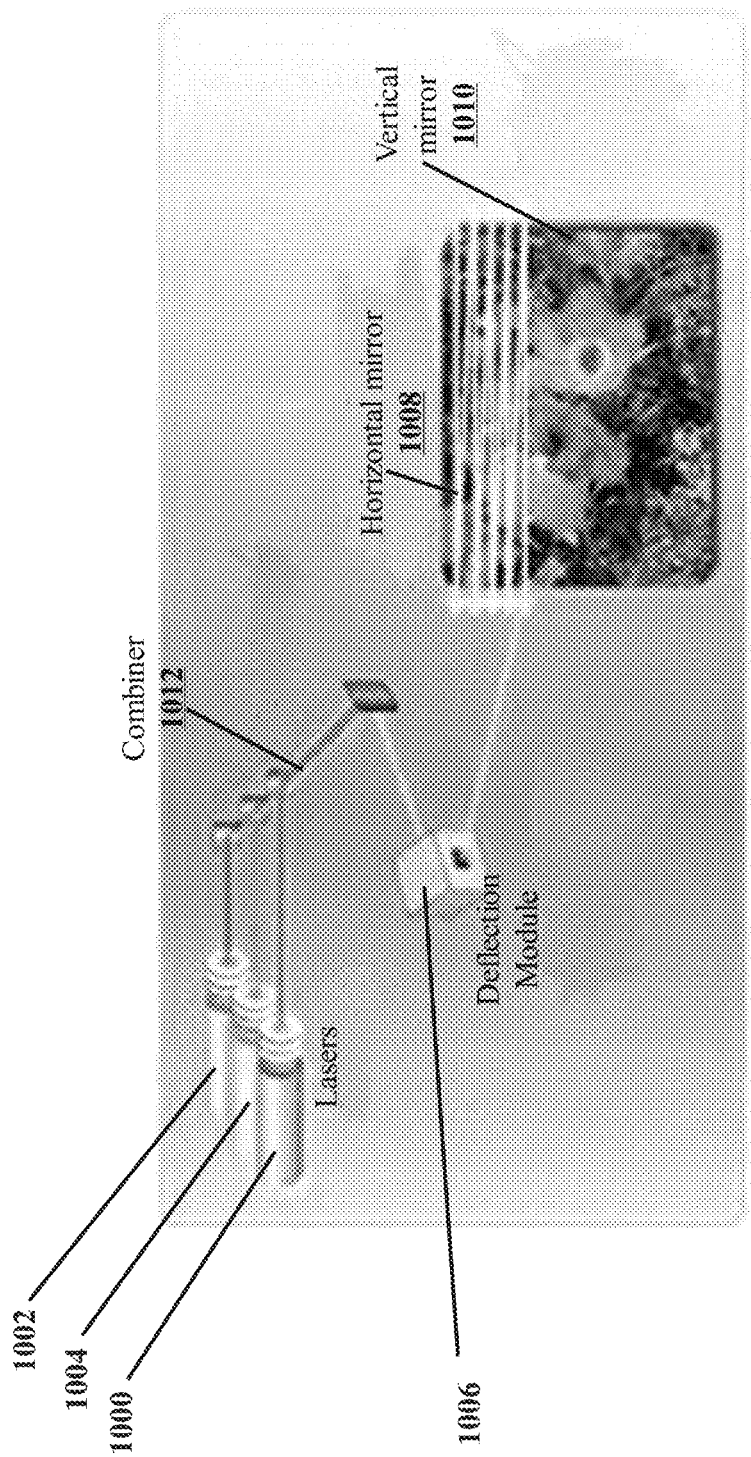
FIG. 10 shows a laser source system, according to an embodiment.

FIG. 10 shows three lasers, such as a first laser 1000, a second laser 1002, and a third laser 1004. The first laser 1000, the second laser 1002, and the third laser 1004 are with red, green, and blue wavelengths, which may be combined into single laser source. The laser source may be modulated to create varying resolutions, which may resemble an ocular resolution of a human eye. Due to a highly collimated laser source, pixels generated by light pulses of the laser source may always be in focus and requires no projection lens. A processor associated with the laser source may modulate intensities of the lasers for color depth and pulsed over time for pixel pitches.

A deflection module 1006 may be a scanning mirror, which may be arranged to scan a raster image onto a projection surface. A horizontal mirror 1008 may scan the horizontal pixels at resonance, and a vertical mirror 1010 may scan the pixels at slower rates usually with a closed loop algorithm. The deflection module 1006 may include a 3-axis laser scanner with focus tunable lens, which may be used to facilitate a combiner 1012 that is of a geometric shape to facilitate beam steering into a retina of the eye. In one non-limiting example, a curved spherical combiner may be used, but focus points may require to be tuned for pixel to pixel mapping based on the curvature of the spherical combiner, which may set a focus point at the retina.

Figure 11:
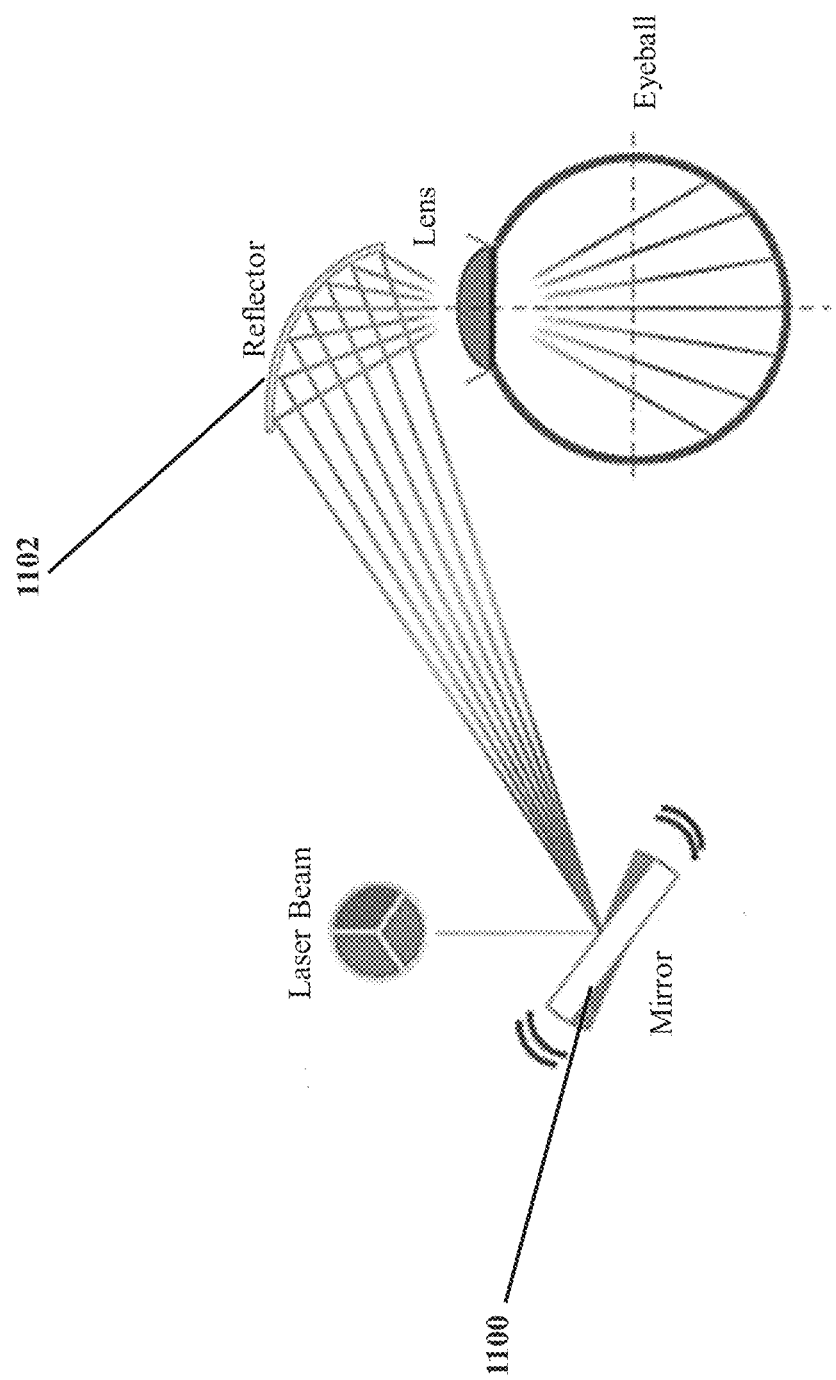
FIG. 11 shows a foveated projection system, according to an embodiment.

FIG. 11 shows a foveated projection system integrated to a wearable device where a mirror 1100 may scan out an image onto a reflector 1102 and where the reflector 1102 may focus an imaging source into a back of a retina of an eye. The foveated projection system described herein may be used for user specific content through objection recognition of billboards and advertisement spaces. For instance, the wearable device using the foveated projection system may be a near-eye AR glasses, which may have numerous applications with defense, training and simulations, entertainment, computing, engineering and design, real estate visualization, architecture, manufacturing and assembly visualization processes and many other immersive and non-immersive applications.

FIG. 12 shows execution of a method showing operations of a foveated projection system, according to a method 1200. The method 1200 shown in the FIG. 12 may include execution steps 1202, 1204, 1206, 1208, and 1210. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

In a first step 1202, a first light emitter may be located within a wearable device used by a user. The wearable device may include at least one lens and a mirror. The first light emitter may include a semiconductor light emitter component, such as a light emitting diode. The first light emitter may emit a non-visible light directed to an eye of the user wearing the wearable device. The mirror may direct the non-visible light to the eye. A processor may adjust an angular position of the mirror. The non-visible light may be an infrared or a ultra-violet light. The non-visible light may be an infrared (IR) or an ultraviolet (UV) light.

In a next step 1204, a light detector within the wearable device may detect the non-visible light as reflected from the eye of the user via the mirror. The non-visible light may be reflected from the eye and then reflect against the mirror. After the reflection against the mirror, the non-visible light may be detected by the light detector.

In a next step 1206, upon the light detector detecting the non-visible light, a processor associated with the wearable device may process detected non-visible light. The processor may process the detected non-visible light to measure a reflection of the non-visible light from the eye of the user. The processor may use information associated with detected reflection of the non-visible light to determine a gaze location of the eye of the user.

In a next step 1208, a second oscillating light emitter located within the wearable device may transmit visible light pulses directed towards the eye of the user. The second oscillating light emitter may be a laser beam scanner. The second oscillating light emitter may emit the visible light pulses of red, blue, or green.

The second oscillating light emitter may transmit the visible light pulses along a plurality of scan lines to an area proximate to the gaze location of the eye of the user. The plurality of scan lines may form one scan dimension of a two dimensional laser beam scanner. The visible light pulses transmitted to the area proximate to the gaze location of the eye of the user may form an image on the lens of the wearable device, which may be visible to the eye of the user. The image may be part of a video frame. Each light pulse may correspond to a pixel of the image. A portion of the image presented on the lens of the wearable device at the gaze location of the eye of the user may have a higher resolution than portions of the image presented on the lens of the wearable device at non-gaze locations of the eye of the user.

In a next step 1210, while the second oscillating light emitter is transmitting the visible light pulses directed towards the eye of the user, the first light emitter may continuously emit the non-visible light directed to the eye of the user. The light detector may also continuously detect the non-visible light as reflected from the eye of the user. The processor may continuously determine the current gaze location of the eye of the user based on the non-visible light detected by the light detector. Using the current gaze location of the eye of the user, the processor may continuously modulate the visible light pulses transmitted to the area proximate to the current gaze location of the eye of the user. The processor may continuously modulate the visible light pulses such that a time interval between the visible light pulses at the current gaze locations of the eye of the user may be shorter than the time interval between the visible light pulses at the non-gaze locations of the eye of the user. A pixel pitch of the image at the gaze location may be shorter than the pixel pitch of the image at non-gaze locations.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system for generating a foveated display, the system comprising:
    a first light emitter located within a wearable device used by a user, wherein the first light emitter is configured to emit a non-visible light directed to an eye of the user wearing the wearable device;
    a light detector located within the wearable device, wherein the light detector is configured to detect the non-visible light as reflected from the eye;
    a processor associated with the wearable device is configured to determine a gaze location of the eye based on detected reflection of the non-visible light; and
    a second oscillating light emitter located within the wearable device, wherein the second oscillating light emitter is configured to transmit visible light pulses along a plurality of scan lines to an area proximate to the gaze location of the eye such that the visible light pulses form an image on lens of the wearable device, which is visible to the eye, wherein each visible light pulse corresponding to a pixel of the image,
    wherein, while the second oscillating light emitter is transmitting the visible light pulses towards the eye, the first light emitter is further configured to continuously emit the non-visible light directed to the eye, the light detector is further configured to continuously detect the non-visible light as reflected from the eye, the processor is further configured to continuously determine the current gaze location of the eye of the user based on the non-visible light detected by the light detector, and the second oscillating light emitter is further configured to dynamically adjust pixel resolution at a portion of the lens in line with the current gaze location of the eye of the user, and wherein, as the gaze location changes, a high fidelity resolution seamlessly moves from one region of the lens to a new region of the lens; and
    wherein the processor is further configured to modulate the visible light pulses based on the current gaze location of the eye, wherein the visible light pulses are continuously modulated such that a time interval between the visible light pulses at the current gaze location of the eye is shorter than the time interval between the visible light pulses at non-gaze locations of the eye of the user such that a pixel pitch of the image at the gaze location is shorter than the pixel pitch of the image at the non-gaze locations.

2. The system of claim 1, wherein the non-visible light is at least one of infrared or ultra-violet.

3. The system of claim 1, wherein the second oscillating light emitter is a laser beam scanner.

4. The system of claim 1, further comprising:
    a mirror configured to direct:
        the non-visible light to the eye;
        reflection of the non-visible light to the light detector; and
        the visible light pulses to the scan lines in the area proximate to the eye.

5. The system of claim 4, wherein the processor is further configured to adjust an angular position of the mirror.

6. The system of claim 1, wherein the image is a video frame.

7. The system of claim 1, wherein a portion of the image on the lens of the wearable device at the gaze location of the eye has a higher resolution than portions of the image presented on the lens of the wearable device at non-gaze locations of the eye.

8. The system of claim 1, wherein the second oscillating light emitter is further configured to emit the visible light pulses of at least one of red, blue, and green.

9. The system of claim 1, wherein the plurality of scan lines form one scan dimension of a two: dimensional scanner.

10. A method comprising:
    emitting, by a first light emitter located within a wearable device used by a user, a non-visible light directed to an eye of the user wearing the wearable device;

detecting, by a light detector located within the wearable device, the non-visible light as reflected from the eye;

determining, by a processor associated with the wearable device, a gaze location of the eye based on detected reflection of the non-visible light;

transmitting, by a second oscillating light emitter located within the wearable device, visible light pulses along a plurality of scan lines to an area proximate to the gaze location of the eye such that the visible light pulses form an image on lens of the wearable device, which is visible to the eye, wherein each light pulse corresponding to a pixel of the image, wherein, while the visible light pulses are transmitted by the second oscillating light emitter towards the eye, the non-visible light directed to the eye is continuously emitted by the first light emitter, the non-visible light as reflected from the eye is continuously detected by the light detector, the current gaze location of the eye of the user is continuously determined by the processor, based on the non-visible light detected by the light detector, and pixel resolution at a portion of the lens in line with the current gaze location of the eye of the user is dynamically adjusted by the second oscillating light emitter, and wherein, as the gaze location changes, a high fidelity resolution seamlessly moves from one region of the lens to a new region of the lens; and modulating, by the processor, the visible light pulses based on the current gaze location of the eye, wherein the visible light pulses are continuously modulated such that a time interval between the visible light pulses at the current gaze location of the eye is shorter than the time interval between the visible light pulses at non-gaze locations of the eye of the user such that a pixel pitch of the image at the gaze location is shorter than the pixel pitch of the image at the non-gaze locations.

11. The method of claim 10, wherein the non-visible light is at least one of infrared or ultra-violet.

12. The method of claim 10, wherein the second oscillating light emitter is a laser beam scanner.

13. The method of claim 10, further comprising:
directing, by a mirror, the non-visible light to the eye, reflection of the non-visible light to the light detector, and the visible light pulses to the scan lines in the area proximate to the eye.

14. The method of claim 13, further comprising:
adjusting, by the processor, an angular position of the mirror.

15. The method of claim 10, wherein the image is a video frame.

16. The method of claim 10, wherein a portion of the image on the lens of the wearable device at the gaze location of the eye has a higher resolution than portions of the image presented on the lens of the wearable device at non-gaze locations of the eye.

17. The method of claim 10, further comprising: emitting, by the second oscillating light emitter, the visible light pulses of at least one of red, blue, and green.

18. The method of claim 10, wherein the plurality of scan lines form one scan dimension of a two: dimensional scanner.

19. The system of claim 1, wherein a percentage amount of pixels for concentration in any portion of the lens being viewed by the user is dependent on at least a distance between the eye and lens.

20. The system of claim 1, wherein a percentage amount of pixels for concentration in any portion of the lens being viewed by the user is dependent on a medical condition of the eye of the user, wherein the medical condition is stored in a local memory associated with the wearable device, and wherein, when the medical condition is above average, then 80 percentage of all pixels is concentrated on a first portion of the lens, which is in line with the current gaze location, and, when the medical condition is average, then 88 percentage of all pixels is concentrated on the first portion of the lens based on the current gaze location.

* * * * *